US011182793B2

(12) United States Patent
Maddukuri et al.

(10) Patent No.: US 11,182,793 B2
(45) Date of Patent: Nov. 23, 2021

(54) SYSTEMS AND METHODS FOR TRANSACTION ACCOUNT TOKENIZATION

(71) Applicant: American Express Travel Related Services Company, Inc., New York, NY (US)

(72) Inventors: Ajay B. Maddukuri, Phoenix, AZ (US); Keshav A. Narsipur, Chandler, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 1155 days.

(21) Appl. No.: 15/058,988

(22) Filed: Mar. 2, 2016

(65) Prior Publication Data

US 2017/0255937 A1    Sep. 7, 2017

(51) Int. Cl.
*G06Q 20/40* (2012.01)
*G06Q 20/36* (2012.01)
*G06Q 20/38* (2012.01)

(52) U.S. Cl.
CPC ..... *G06Q 20/4016* (2013.01); *G06Q 20/3674* (2013.01); *G06Q 20/3829* (2013.01)

(58) Field of Classification Search
CPC .......... G06Q 20/4016; G06Q 20/3674; G06Q 20/3829
See application file for complete search history.

(56) References Cited

U.S. PATENT DOCUMENTS

| | | | |
|---|---|---|---|
| 2006/0136332 A1* | 6/2006 | Ziegler | G06F 21/31 705/39 |
| 2012/0130898 A1* | 5/2012 | Snyder | G06Q 20/32 705/44 |
| 2015/0032625 A1* | 1/2015 | Dill | G06Q 20/385 705/44 |
| 2016/0104163 A1* | 4/2016 | Aquino | G06Q 20/4016 705/44 |
| 2016/0119296 A1* | 4/2016 | Laxminarayanan | H04L 63/0428 713/168 |
| 2017/0178124 A1* | 6/2017 | Havilio | G06Q 20/3674 |
| 2017/0200150 A1* | 7/2017 | Cohn | G06Q 20/38215 |
| 2018/0268403 A1* | 9/2018 | Guglani | G06Q 20/38215 |

* cited by examiner

*Primary Examiner* — Jamie R Kucab
*Assistant Examiner* — Nicholas K Phan
(74) *Attorney, Agent, or Firm* — Thomas Horstemeyer, LLP

(57) ABSTRACT

A system may receive a request for a payment payload for a payment transaction with the request including a token and a transaction amount. The token may identify a transaction account for use in the payment transaction. The system may assess the risk of fraud associated with the transaction account and the payment transaction. The system may return the payment payload in response to a favorable risk assessment. The payment payload may be passed to a merchant and from the merchant to a payment network for evaluation. The payment transaction may be approved or declined based on the contents of received payment payload matching the contents of a generated payment payload.

20 Claims, 5 Drawing Sheets

SYSTEMS AND METHODS FOR TRANSACTION ACCOUNT TOKENIZATION

FIELD

This disclosure relates to cloud-based tokenization for transaction accounts.

BACKGROUND

As e-commerce grows prevalent in day-to-day spending, so do digital transactions. Digital transactions may include a consumer providing transaction account information to complete purchases. Transaction account information may also be stored on a digital wallet running on a user device, in a file at a merchant or service provider, at an application content provider, and/or on a user device in an application. When storing transaction account information at additional locations, the risk of an information breach may increase. Similarly, the risk of an information breach may be increased by transmitting transaction account information between parties to complete a purchase transaction. Additionally, security measures taken to protect sensitive data (e.g., account information) may incur processing and communication overhead associated with digital processing.

SUMMARY

A system, method, and computer readable medium (collectively, the "system") is disclosed for tokenizing transaction accounts and/or completing purchase transactions using the tokenized transaction accounts. The system may receive a request for a payment payload for a payment transaction, wherein the request includes a token and a transaction amount. The token may identify a transaction account for use in the payment transaction. The system may assess the risk of fraud associated with the transaction account and the payment transaction. The system may return the payment payload in response to a favorable risk assessment. The payment payload may be passed to a merchant and from the merchant to a payment network for evaluation. The payment transaction may be approved or declined based on the contents of the received payment payload matching the contents of a generated payment payload.

In various embodiments, the request for the payment payload may comprise an application programming interface (API) call. The API call may comprise the token, a token expiry, a cryptogram, an account transaction counter (ATC), an unpredictable number (UN), and/or a card verification result (CVR). The system may generate the payment payload in response to the API call, wherein the payment payload comprises at least one of the token, the token expiry, the cryptogram, the ATC, the UN, or the CVR.

In various embodiments, the system may receive a tokenization request to tokenize the transaction account and verify that the transaction account is eligible for tokenization. The system may transmit a response payload in response to the request for tokenization. The response payload may include one or more of encrypted account data, a terms and conditions URL, and a globally unique identifier. The system may also secure the payment payload for transmission using at least one of encryption or a secure sockets layer (SSL).

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

The present disclosure provides a system, method, and computer program product for conducting online transactions using tokenized transaction account information. Risk factors for fraud or other risks in a given transaction may be evaluated at one or more phases during tokenization and/or payment processing to improve security. A favorable risk score may result in a transaction moving forward, but an unfavorable risk score may result in terminating the transaction. The number of back-and-forth calls between a token requestor and a token service provider may be limited to improve speed and ease of transactions. An application programming interface (API) may enable tokenization clients to retrieve a token and payment cryptogram in a single API call to a payment network provider.

As used herein, phrases similar to "tokenize" or "tokenization" may refer to generation of an alias or alternative identifier for sensitive data. For example, a tokenized transaction account may include an alternative account identification code generated to obfuscate the actual transaction account code for inclusion in external transmissions. In that regard, tokenization of sensitive data may tend to create a barrier for third parties trying to capture the underlying sensitive data.

Figure 1:
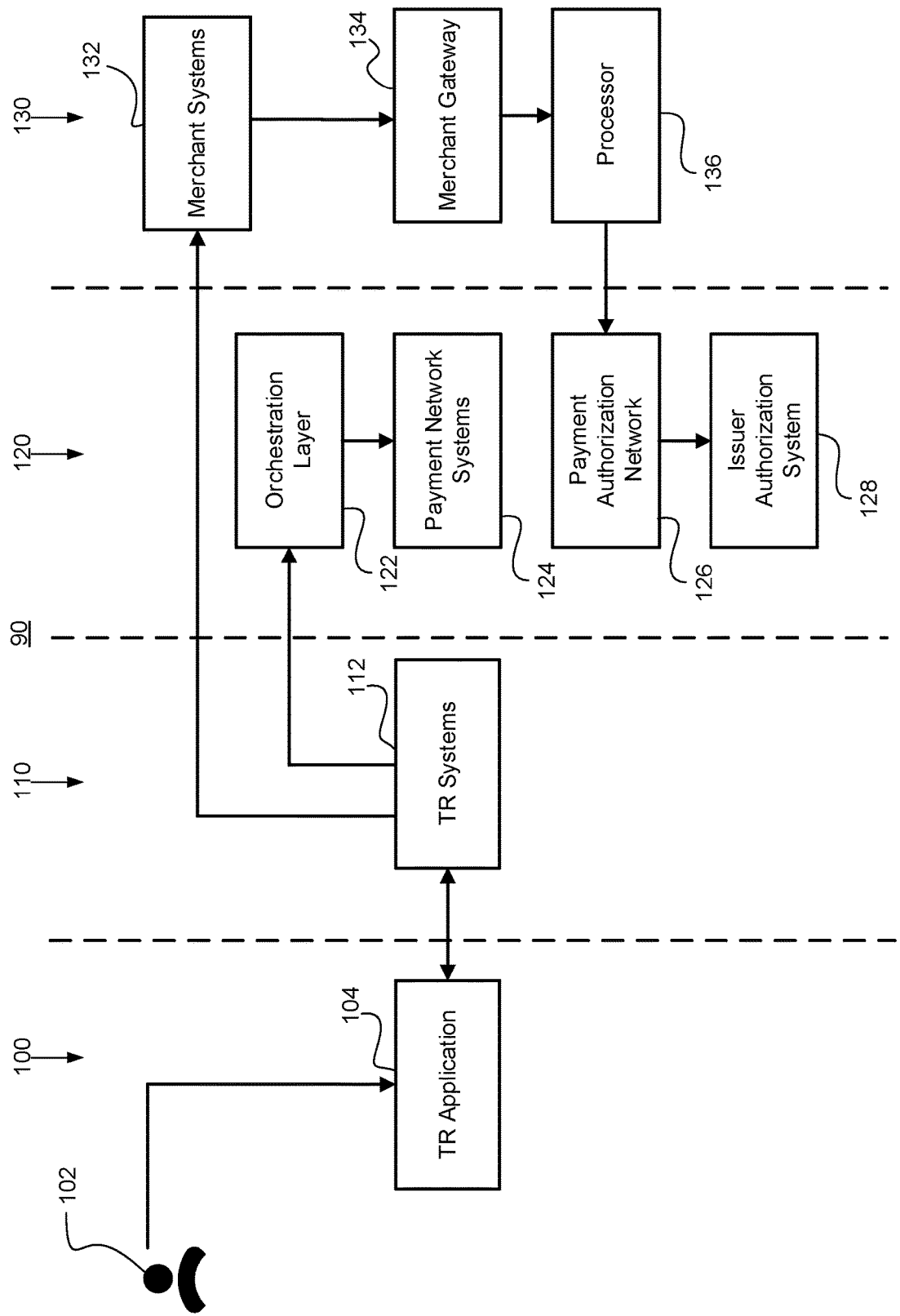
FIG. 1 illustrates an exemplary token-based system for provisioning tokens and completing digital purchase transactions using tokens, in accordance with various embodiments.

With reference to FIG. 1, a system 90 for tokenizing transaction account information and completing token-based purchase transactions is shown, in accordance with various embodiments. System 90 may comprise a computing device 100 running a token requestor application 104. Computing device 100 may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices, smartphones, terminals, televisions, or any other device capable of receiving data over a network.

Computing device 100 may run a token requestor application 104 such as MICROSOFT® INTERNET EXPLORER®, MOZILLA® FIREFOX®, GOOGLE® CHROME®, APPLE® Safari, or any other of the myriad software packages available for completing online purchases with online merchants. Computing device 100 may also run a token requestor application 104 comprising one or more dedicated applications for completing online transactions. Dedicated applications may include, for example, social media applications including FACEBOOK®, INSTAGRAM®, LINKEDIN®. User 102 using computing device 100 may thus initiate transactions using token requestor application 104 on computing device 104. For example, user 102 may select a product displayed in a merchant's advertisement feed of the token requesting application.

In various embodiments, system 90 may include a token requestor 110 having token requestor systems 112. Token requestor systems 112 may comprise one or more servers configured to provide backend support for token requestor application 104. Token requestor systems 112 may communicate with merchant 130 by way of merchant systems 132. Merchant systems 132 may comprise one or more servers providing sales support for goods and/or services offered by merchant 130. Merchant 130 may interface with token requestor systems 112 to complete transactions for goods and/or services offered by merchant 130 through the token requestor application 104 operating on computing device 100.

In various embodiments, merchant 130 may include a merchant gateway 134 configured to process payment payload data. The merchant gateway may prepare payment payload data for processor 136 to communicate with payment network 120 according to predetermined standards. Processor 136 may submit payment payload data to payment authorization network 126 for processing.

Issuer authorization system 128 may compute payment cryptograms and/or run a risk assessment of the transaction. Issuer authorization system 128 may decline a transaction or a tokenization request in response to an incorrect cryptogram and/or an unfavorable risk assessment, as described in greater detail below.

System 90 may further include a payment network 120 in electronic communication with merchant 130 and/or token requestor 110. Payment network may provide an orchestration layer 122 serving as a communication point for token requestor systems 112 for both token provisioning as well as payment support using tokens. Orchestration layer 122 may thus include an API interface that returns a token and/or cryptogram in response to requests made by token requestor systems 112, as discussed in greater detail below. Orchestration layer 122 may pass data and/or requests to payment network systems 124 for processing. Payment network systems 124 may perform risk assessment, token generation, cryptogram generation, and otherwise support token-based payments.

Communication between merchant systems 132 and token requestor systems 112 may be encrypted using, for example, asymmetric encryption with a public key of merchant 130. Communication between merchant systems 132 and token requestor systems 112 may also be encrypted using a symmetric algorithm and a previously exchanged private key. In that regard, communication described herein between computing device 100, token requestor 110, merchant 130, and/or payment network 120 may include encryption performed by way of any of the techniques now available in the art or which may become available—e.g., Twofish, RSA, El Gamal, Schorr signature, DSA, PGP, PKI, GPG (GnuPG), and symmetric and asymmetric cryptosystems. Electronic network communication between computing device 100, token requestor 110, merchant 130, and/or payment network 120 may also implement security protocols such as Secure Sockets Layer (SSL), Transport Layer Security (TLS).

Figure 2A:
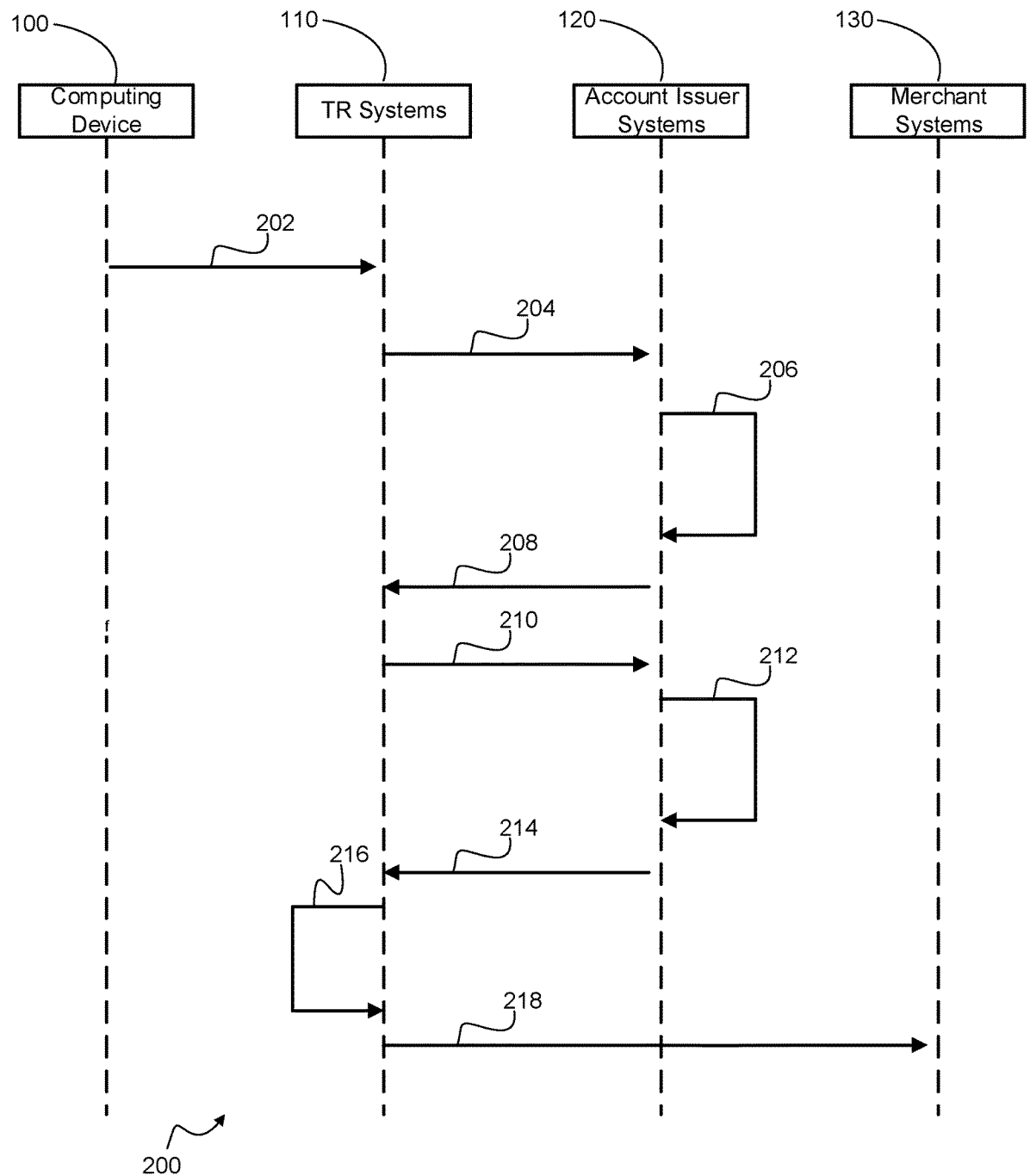
FIG. 2A illustrates an exemplary flow chart for provisioning tokens for use in completing purchase transactions in a token-based system, in accordance with various embodiments.
Figure 2B:
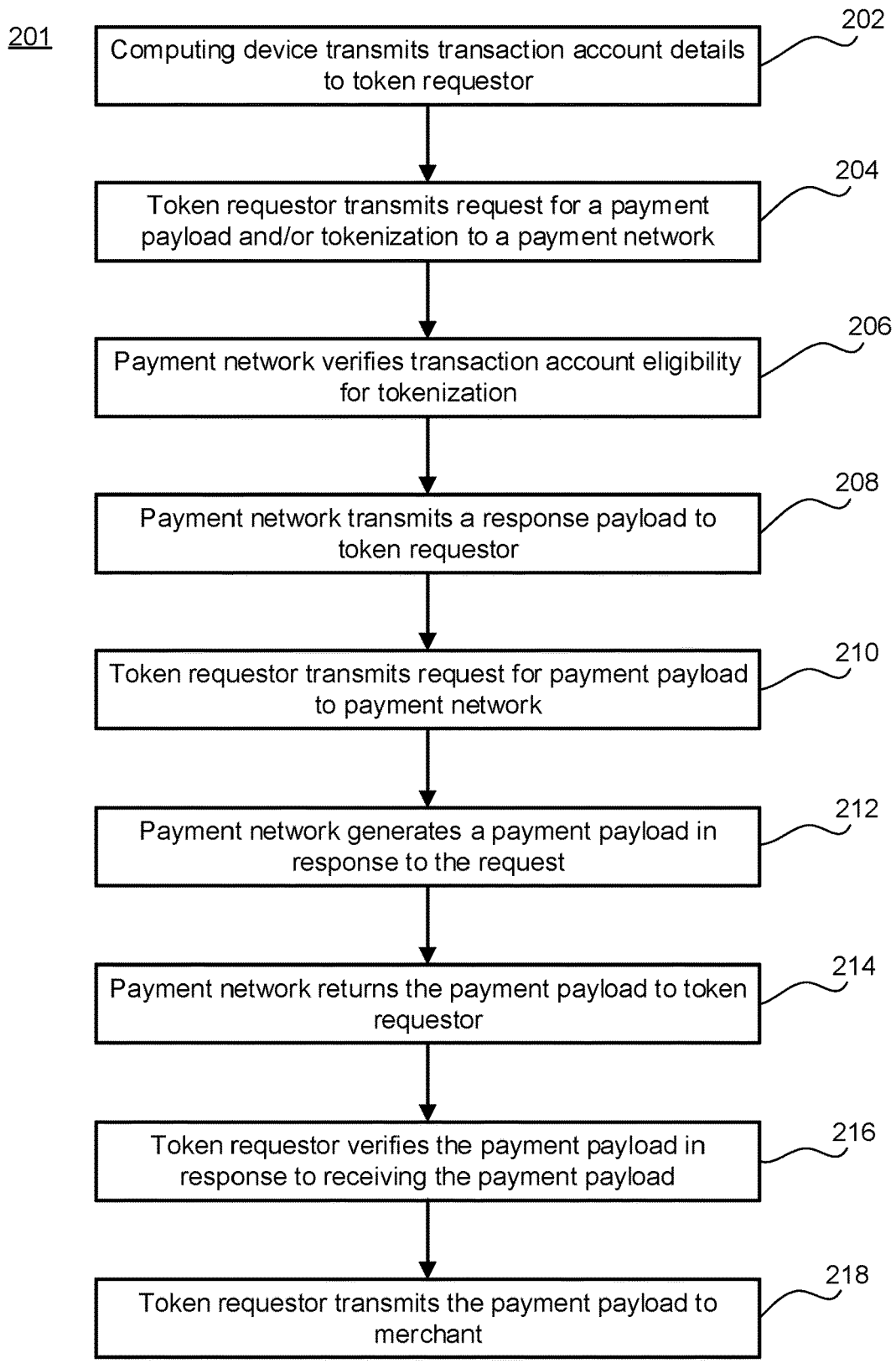
FIG. 2B illustrates an exemplary process of provisioning tokens for use in completing purchase transaction, in accordance with various embodiments.

Referring to FIGS. 2A and 2B, flow chart 200 is shown for executing process 201 to provision tokens and complete a transaction on system 90 of FIG. 1, in accordance with various embodiments. User 102 may select "buy" in token requestor application 104 running on computing device 100. User 102 may enter transaction account information such as account number, card verification code, expiry, and/or billing address in response to a transaction account not being on file with token requestor 110. The card verification code may include a CVV2, CVC2, CVD, CID, or other verification code typically included on the back of a payment card associated with a transaction account. In response to one or more transaction accounts being on file with token requestor 110, user 102 may select a transaction account on file for use in completing the transaction. Computing device 100 may transmit transaction account details to token requestor 110 (Step 202). The transaction account details may include a selected account, if on file, and/or transaction account details provided by user 102.

In various embodiments, token requestor systems 112 may receive the transaction account details for use in further communication with payment network 120 and merchant 130. Token requestor systems 112 may securely transmit a request for a payment payload and/or tokenization to a payment network 120 (Step 204). Token requestor systems 112 may transmit the request by way of orchestration layer 122. The request may include transaction account details, risk assessment variables, an unpredictable number (UN), a transaction amount, and/or currency for evaluation by payment network 120. Risk assessment variables may include a merchant ID, transaction history at merchant, purchase amount, token requestor risk score, merchant location, and/or other factors for assessing fraud risk.

The request may be initiated by token requestor systems 112 using an API call and passing predetermined inputs at predetermined locations in the call, as provided by payment network 120 in API documentation. Token requestor systems 112 may use encryption to protect data transmitted to payment network systems 122. For example, token requestor systems 112 may generate an AES 128 bit key and encrypt account data (e.g., account identifier, CARD VERIFICATION CODE, expiry and/or account reference id) using the AES 128 bit key. Token requestor systems 112 may encrypt the AES 128 bit key using a web service encryption public key infrastructure (PKI) made available by payment network 120 for secure transmission to payment network 120. Token requestor systems 112 may generate an ephemeral key pair and include an ephemeral public key on secure data included in a request. Token requestor systems 112 may further include account data, secure data, user data, device data, transaction details (e.g., transaction amount, currency, date), UN and other fields for use by payment network 120 in evaluating a request, tokenizing account data, and/or approving transactions.

In various embodiments, payment network 120 may verify transaction account eligibility for tokenization (Step 206). Eligibility may be based on an opt-in or opt-out decision by user 102 or an evaluation of user 102 based on known characteristics and transaction account history to determine eligibility. In response to the transaction account being eligible for tokenization, payment network 120 may generate an AES 128 bit key to encrypt account data (e.g., an account reference ID or token), encrypt the 128 bit AES key with the token requestor's web service encryption PKI, and return the encrypted account data and/or token to token requestor systems 112.

In various embodiments, payment network 120 may transmit a response payload to token requestor 110 (Step 208). The response payload may include encrypted account data, an issuer terms and conditions URL, a time bound globally unique identifier (GUID), and/or a "hypermedia as the engine of application state" link (HATEOAS link). Token requestor 110 may transmit a request for a payment payload to payment network 120. The payment payload request may include indicia of acceptance of the terms and conditions such as a timestamp.

In various embodiments, token requestor 110 may submit a request for a payment payload to payment network 120 (Step 210). The request may be made in the form of an API call from token requestor 110 to payment network 120. Payment network 120 may generate a payment payload in response to the request from token requestor 110 (Step 212). Payment network 120 may also conduct a risk assessment in response to a request for a payment payload. The risk assessment may evaluate user data such as account history and spending habits. The risk assessment may also consider device data of computing device 100 such as device attestation data and history using the device in association with the transaction account. The risk assessment may further consider transaction data such as transaction amount, transaction location, and/or transaction time. A favorable risk assessment indicating an acceptable fraud risk may result in generation of the payment payload. In response to an unfavorable risk assessment indicating an unacceptable fraud risk, payment network 120 may terminate the transaction and not return a payment payload to token requestor 110. The result of the risk assessment may be captured in a card verification result (CVR).

In various embodiments, the payment payload may comprise arguments passed to payment network 120, along with the request for a payment payload. The arguments may include one or more of a token, a token expiry, a cryptogram, transaction details, an account transaction counter (ATC), the UN, the CVR, and/or other suitable data. The cryptogram may be generated using the UN, the ATC, and the CVR. Payment network 110 may return the payment payload to token requestor 110 including security measures in response to the request and/or in response to a successful risk assessment (Step 214). The secure payment payload may be secured by encryption, hash-based message authentication code (HMAC), and/or digital signatures, for example.

In various embodiments, token requestor 110 may verify the secure payment payload in response to receiving the secure payment payload (Step 216). Security may be verified by confirming expected values and decrypting any applied encryption, hash-based message authentication code (HMAC), and/or digital signatures. For example, the payment payload may be verified by generating a shared secret using an ephemeral private key and the token receiver public key, deriving an AES 128 bit symmetric master key from the shared secret, deriving an AES 128 bit DEK and MAC using AES 128 bit symmetric master key and key diversification method, verifying HMAC of the encrypted payment payload using AES 128 bit MAC, and/or decrypting the encrypted payment payload using the AES 128 bit DEK.

In various embodiments, token requestor 110 may submit the payment payload to merchant 130 (Step 318). The payment payload submitted to merchant 130 may include the token, token expiry, ATC, UN, CVR, and/or cryptogram. The payment payload may be encrypted for transmission to merchant 130 using, for example, public keys made available by merchant 130. For authorization, merchant 130 may forward all or part of the payment payload to payment network 120. Payment network may conduct a risk assessment and analyze the transaction and transaction account to approve or decline the payment. In evaluating the transaction, payment network 120 may match the cryptogram received from merchant 130 to the cryptogram originally generated by payment network 120 to ensure the payment payload has not been altered. Payment network 120 may also produce a regenerated cryptogram using the payment payload contents and match the regenerated cryptogram to the cryptogram originally generated by payment network 120 to ensure the payment payload has not been altered.

Figure 3A:
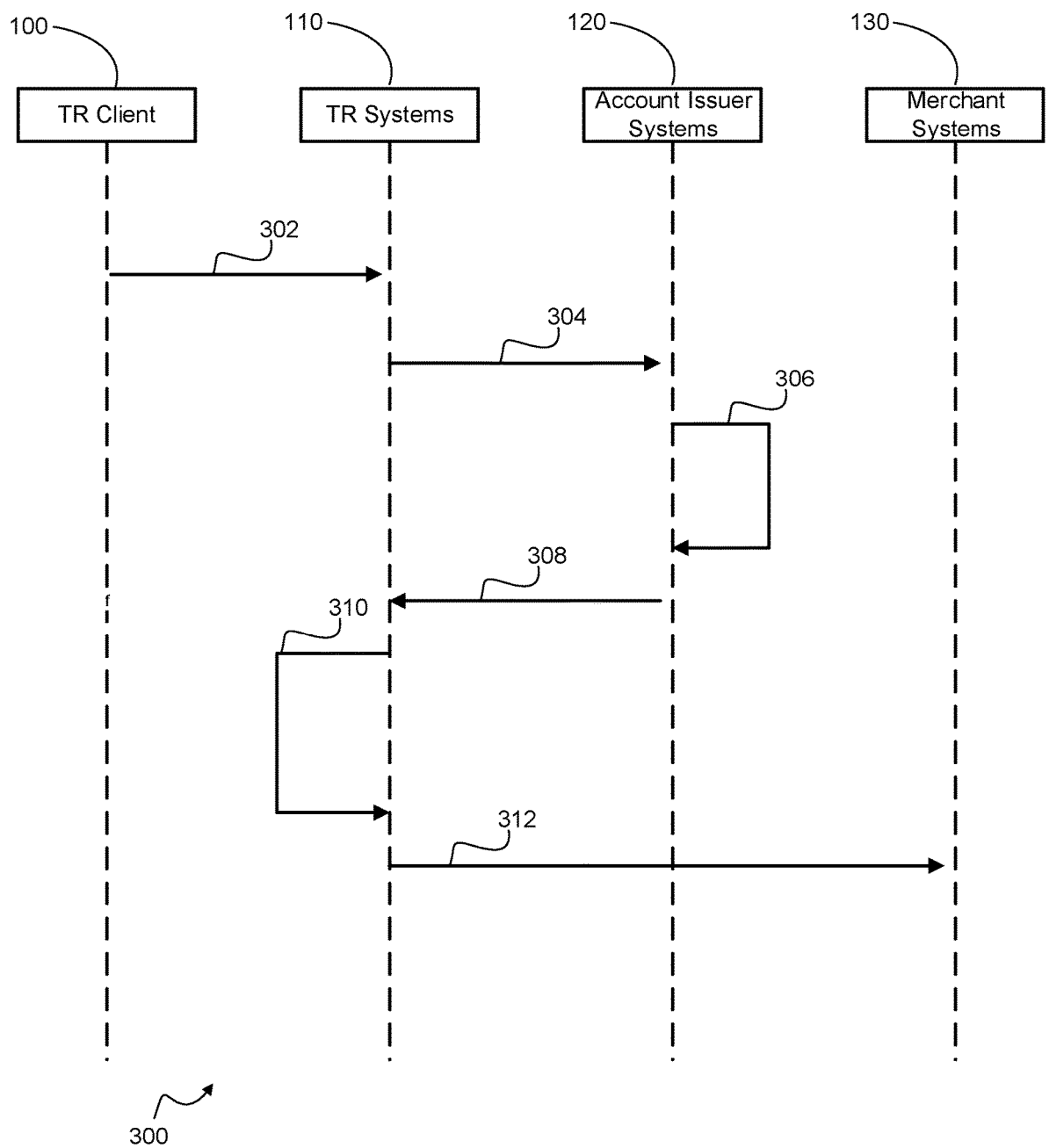
FIG. 3A illustrates an exemplary flow chart for completing purchase transactions using a token-based system, in accordance with various embodiments.
Figure 3B:
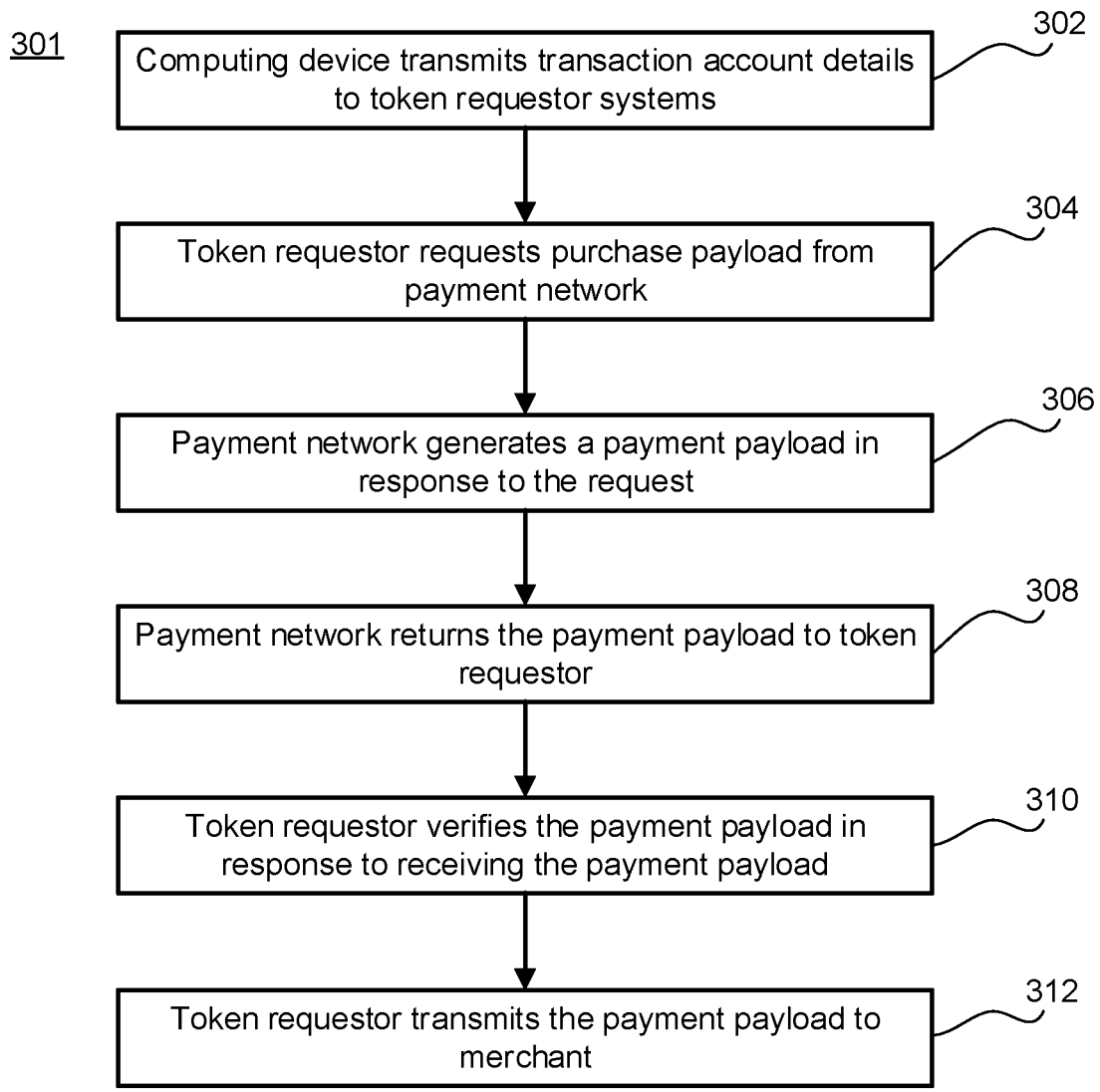
FIG. 3B illustrates an exemplary process for completing purchase transactions using a token-based system, in accordance with various embodiments.

Referring to FIGS. 3A and 3B, flow chart 300 is shown for executing process 301 to complete a transaction using a tokenized transaction account on system 90 of FIG. 1, in accordance with various embodiments. Process 301 may be similar to process 201 described above using a tokenized transaction account to complete the transaction. User 102 may select buy in token requestor application 104 running on computing device 100. User 102 may select a tokenized transaction account displayed on computing device 100 to complete the transaction. Computing device 100 may transmit transaction account details to token requestor systems 112 (Step 302). Transmitted transaction account details may include the token reference ID and/or a transaction account alias to identify the selected transaction account.

In various embodiments, token requestor 110 may request a purchase payload from payment network 120 (Step 304). The payment payload may be requested using an API call to payment network 120 and passing predetermined transaction data. For example, token requestor 110 may submit an API request including a token reference identifier, secure data, user data, device data, transaction information, the unpredictable code, and other fields as determined by API documentation made available by payment network 120.

In various embodiments, payment network 120 may return the payment payload to token requestor 110 (Step 308). Token requestor 110 may verify the payment payload in response to receiving the payment payload (Step 310).

The payment payload may be returned securely and verified as described above with reference to FIGS. 2A and 2B. Token requestor 110 may transmit the payment payload to merchant 130 (Step 312). Communication with merchant 130 may be made securely using the various secure communication techniques described herein such as encryption.

In various embodiments, the systems and methods described herein may include support for one or more aggregate APIs to reduces the number of back and forth calls between token requestor 110 and payment network 120 for tokenization and purchase transactions. The aggregate API may include tokenization and payment credential capabilities on just one call from token requestor 110. The API may be capable of performing tokenization eligibility checks, risk assessment, creating token and generating cryptogram based on user 102, computing device 100, and transaction information provided by token requestor 110 to purchase network 120. The aggregate API may provide payment credentials on just one call from the token requestor 110. In that regard, the aggregate api may tend to reduce the number of back and forth calls between token requestor 110 and payment network 120 for purchase transactions using a tokenized transaction account. The API may also support payment network 120 performing risk assessment and generating cryptogram based on the user, device and transaction information provided by the token requestor 110 using an API call.

In various embodiments, the aggregate API may internally orchestrate calls to one or more API internal to payment network 120 at a granular level for tokenization and cryptogram generation within payment network 120. Payment network 120 may generate tokens at a user level to allow so that the same token may be used by multiple computing devices 100 logged in and/or authenticated with the same user 102. The token may be multi-use, and the cryptogram generated based at least in part on the token may be one-time-use.

In various embodiments, the one-time-use cryptogram may be generated by payment network 120 on cloud payment network systems 122 (e.g., a payment network cloud) using the token and transaction information received from token requestor 110. Tokens may be deleted for the card issuer and payment network in response to card cancellation and/or token-requestor-triggered token cancellation. Payment network 110 may send the payment payload in an encrypted form in the response to aggregate API calls made by token requestor 110. The payment payload may contain token, token expiry, cryptogram and all other payment attributes used in fraud prevention techniques such as, for example, SafeKey® as described and made available by American Express® at https://network.americanexpress.com/uk/en/safekey/. The transaction for tokenization may be processed as a card-not-present transaction.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "match" or "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

A "consumer profile" or "consumer profile data" may comprise any information or data about a consumer that describes an attribute associated with the consumer (e.g., a preference, an interest, demographic information, personally identifying information, and the like).

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS® NT®, WINDOWS® 95/98/2000®, WINDOWS® XP®, WINDOWS® Vista®, WINDOWS® 7®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the systems may include application servers (e.g. WEB SPHERE, WEB LOGIC, JBOSS) and/or web servers (e.g. APACHE, IIS, GWS, SUN JAVA® SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® NT®, 95/98/2000/CE/Mobile, OS2, UNIX®, LINUX®, SOLARIS®, MacOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. Electronic network communication may implement security protocols such as Secure Sockets Layer (SSL) and Transport Layer Security (TLS). A web client may implement several application layer protocols including http, https, ftp, and sftp.

In various embodiments, components, modules, and/or engines of system 90 may be implemented as micro-applications or micro-apps. Micro-apps are typically deployed in the context of a mobile operating system, including for example, a WINDOWS® mobile operating system, an ANDROID® Operating System, APPLE® IOS®), a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE® talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Phrases and terms similar to an "item" may include any good, service, information, experience, entertainment, data, offer, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the standalone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® APPLE® ts, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the term "end user", "consumer", "customer", "cardmember", "business" or "merchant" may be used interchangeably with each other, and each shall mean any person, entity, government organization, business, machine, hardware, and/or software. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

Phrases and terms similar to an "entity" may include any individual, consumer, customer, group, business, organization, government entity, transaction account issuer or processor (e.g., credit, charge, etc.), merchant, consortium of merchants, account holder, charitable organization, software, hardware, and/or any other type of entity. The terms "user," "consumer," "purchaser," and/or the plural form of these terms are used interchangeably throughout herein to refer to those persons or entities that are alleged to be authorized to use a transaction account.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

The account code may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account code may be, for example, any number or alpha-numeric characters that identify a particular merchant for purposes of account acceptance, account reconciliation, reporting, or the like.

In various embodiments, an account code may identify a consumer. In addition, in various embodiments, a consumer may be identified by a variety of identifiers, including, for example, an email address, a telephone number, a cookie id, a radio frequency identifier (RFID), a biometric, and the like.

Phrases and terms similar to "transaction account" may include any account that may be used to facilitate a financial transaction.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "business" or "merchant" may be used interchangeably with each other and shall mean any person, entity, distributor system, software, and/or hardware that is a provider, broker and/or any other entity in the distribution chain of goods or services. For example, a merchant may be a grocery store, a retail store, a travel agency, a service provider, an on-line merchant or the like.

Phrases and terms similar to "merchant," "supplier" or "seller" may include any entity that receives payment or other consideration. For example, a supplier may request payment for goods sold to a buyer who holds an account with a transaction account issuer.

Phrases and terms similar to a "buyer" may include any entity that receives goods or services in exchange for consideration (e.g. financial payment). For example, a buyer may purchase, lease, rent, barter or otherwise obtain goods from a supplier and pay the supplier using a transaction account.

Phrases similar to a "payment processor" may include a company (e.g., a third party) appointed (e.g., by a merchant) to handle transactions. A payment processor may include an issuer, acquirer, authorizer and/or any other system or entity involved in the transaction process. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will complete the payment transaction. In response to the verification being denied, the payment processor relays the information to the merchant, who may decline the transaction. Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account codes, to ensure that information passes securely between the customer and the merchant and also between merchant and payment processor.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:

receiving, by a payment network, a payment payload request for a payment transaction from a token request system, wherein the payment payload request includes a token and a transaction amount of the payment transaction, wherein the token serves as a reference identifier for a transaction account for the payment transaction, and the payment payload request is received on behalf of a client device;

receiving, by the payment network, device data associated with the client device from the token request system;

performing, by the payment network, a first risk assessment on the payment payload request, wherein performing the first risk assessment is based at least in part on the device data associated with the client device and merchant data associated with the payment transaction, and the device data comprises a user device history associated with the transaction account;

generating, by the payment network, a payment payload for the payment transaction in response to a risk assessment score associated with the first risk assessment meeting a threshold, wherein the payment payload comprises the transaction amount and a first cryptogram generated by the payment network;

transmitting, by the payment network, the payment payload for the payment transaction to the token request system in response to generating the payment payload, wherein the token request system transmits the payment payload to a merchant system;

receiving, by the payment network, a request for authorization of the payment transaction from the merchant system that received the payment payload for the payment transaction, wherein the request for authorization comprises the payment payload; and authorizing, by the payment network, the payment transaction for the merchant system based at least in part on a second risk assessment of the payment payload, wherein the second risk assessment comprises comparing the first cryptogram that was transmitted to the token request system in the payment payload and a second cryptogram received from the merchant system.

2. The method of claim 1, wherein the payment payload request for the payment payload comprises an application programming interface (API) call.

3. The method of claim 2, wherein the API call comprises at least one of the token, a token expiry, an account transaction counter (ATC), an unpredictable number (UN), or a card verification result (CVR).

4. The method of claim 3, wherein the payment payload is generated in response to the API call, wherein the payment payload comprises the at least one of the token, the token expiry, the ATC, the UN, or the CVR.

5. The method of claim 1, further comprising:
receiving, by the payment network, a tokenization request to tokenize the transaction account;
verifying, by the payment network, the transaction account is eligible for tokenization; and
transmitting, by the payment network, a response payload in response to the tokenization request.

6. The method of claim 5, wherein the response payload comprises at least one of encrypted account data, a terms and conditions URL, or a globally unique identifier.

7. The method of claim 1, further comprising securing, by the payment network, the payment payload for transmission using encryption.

8. A computer-based system, comprising:
a processor; and
a tangible, non-transitory memory configured to communicate with the processor, the tangible, non-transitory memory having instructions stored thereon that, in response to execution by the processor, cause a payment network to perform operations comprising:
receiving, by the payment network, a payment payload request for a payment transaction from a token request system, wherein the payment payload request includes a token and a transaction amount of the payment transaction, wherein the token serves as a reference identifier for a transaction account for the payment transaction, and wherein the payment payload request is received on behalf of a client device;
receiving, by the payment network, device data associated with the client device from the token request system;
performing, by the payment network, a first risk assessment on the payment payload request to generate a risk assessment score, wherein performing the first risk assessment is based at least in part on the device data associated with the client device and merchant data associated with the payment transaction, and the device data comprises a user device history associated with the transaction account;
generating, by the payment network, a payment payload for the payment transaction in response to the risk assessment score associated with the first risk assessment meeting a threshold, wherein the payment payload comprises the transaction amount and a first cryptogram generated by the payment network;
providing, by the payment network, the payment payload for the payment transaction to the token request system, wherein the token request system transmits the payment payload to a merchant system;
receiving, by the payment network, a request for authorization of the payment transaction from the merchant system, wherein the request for authorization comprises the payment payload; and
authorizing, by the payment network, the payment transaction for the merchant system based at least in part on a second risk assessment of the payment payload, wherein the second risk assessment comprises comparing the first cryptogram that was transmitted to the token request system in the payment payload and a second cryptogram received from the merchant system.

9. The computer-based system of claim 8, wherein the payment payload request for the payment payload comprises an application programming interface (API) call.

10. The computer-based system of claim 9, wherein the API call comprises at least one of the token, a token expiry, an account transaction counter (ATC), an unpredictable number (UN), or a card verification result (CVR).

11. The computer-based system of claim 10, wherein the payment payload is generated in response to the API call, wherein the payment payload comprises the at least one of the token, the token expiry, the ATC, the UN, or the CVR.

12. The computer-based system of claim 8, further comprising:
receiving, by the payment network, a tokenization request to tokenize the transaction account;
verifying, by the payment network, the transaction account is eligible for tokenization; and
transmitting, by the payment network, a response payload in response to the tokenization request.

13. The computer-based system of claim 12, wherein the response payload comprises at least one of encrypted account data, a terms and conditions URL, or a globally unique identifier.

14. The computer-based system of claim 8, further comprising securing, by the payment network, the payment payload for transmission using encryption.

15. An article of manufacture including a non-transitory, tangible computer readable storage medium having instructions stored thereon that, in response to execution by a processor, cause the processor to perform operations comprising:
receiving, by the processor, a payment payload request for a payment transaction from a token request system, wherein the payment payload request includes a token and a transaction amount of the payment transaction, wherein the token serves as a reference identifier for a transaction account for the payment transaction, and wherein the payment payload request is received on behalf of a client device;
receiving, by the processor, device data associated with the client device from the token request system;
performing, by the processor, a first risk assessment on the payment payload request, wherein performing the first risk assessment is based at least in part on the device data associated with the client device and merchant data associated with the payment transaction, and the device data comprises a user device history associated with the transaction account;
generating, by the processor, a payment payload for the payment transaction in response to a risk assessment score associated with the first risk assessment meeting a threshold, wherein the payment payload comprises the transaction amount and a first cryptogram generated by a payment network;

transmitting, by the processor, the payment payload for the payment transaction to the token request system in response to generating the payment payload, wherein the token request system transmits the payment payload to a merchant system;

receiving, by the processor, a request for authorization of the payment transaction from the merchant system that received the payment payload for the payment transaction, wherein the request for authorization comprises the payment payload and the merchant system receives the payment payload from the token request system; and authorizing, by the processor, the payment transaction for the merchant system based at least in part on a second risk assessment of the payment payload, wherein the second risk assessment comprises comparing the first cryptogram generated by the payment network and a second cryptogram received from the merchant system.

16. The article of claim 15, wherein the payment payload request for the payment payload comprises an application programming interface (API) call.

17. The article of claim 16, wherein the API call comprises at least one of the token, a token expiry, an account transaction counter (ATC), an unpredictable number (UN), or a card verification result (CVR).

18. The article of claim 15, further comprising:
receiving, by the processor, a tokenization request to tokenize the transaction account; and
verifying, by the processor, the transaction account is eligible for tokenization; and transmitting, by the processor, a response payload in response to the tokenization request.

19. The article of claim 15, further comprising: generating, by the processor, an encryption key in response to receiving an indication that the transaction account is eligible for tokenization;
encrypting, by the processor, the token using the encryption key to generate an encrypted token; and
returning, by the processor, the encrypted token to the token request system.

20. The article of claim 15, wherein the merchant data comprises a user transaction history associated with a merchant identifier.

* * * * *